United States Patent Office 3,420,100
Patented Jan. 7, 1969

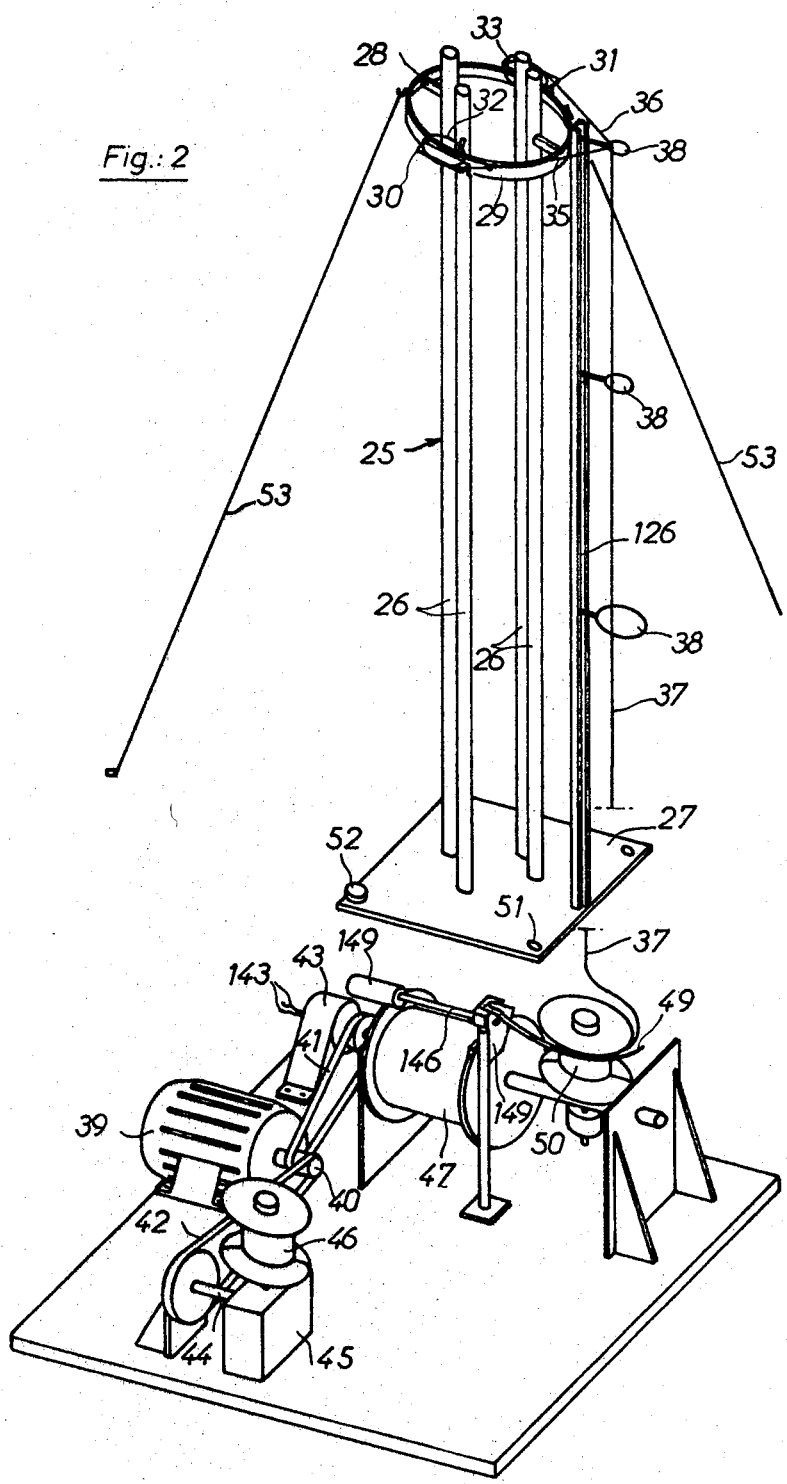

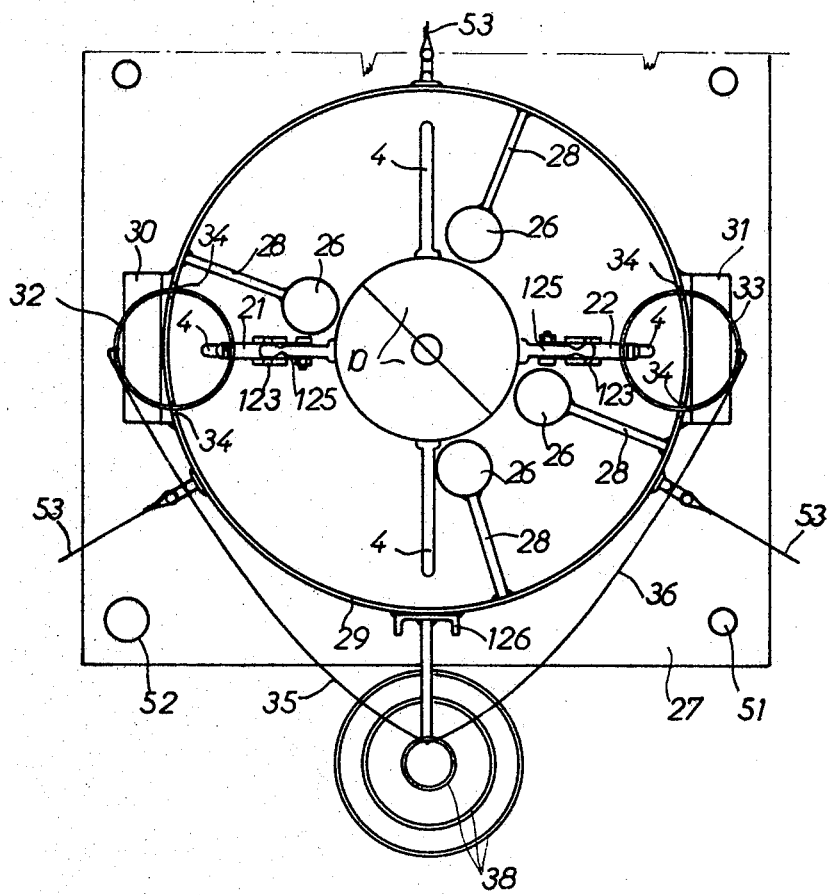
Fig.:3

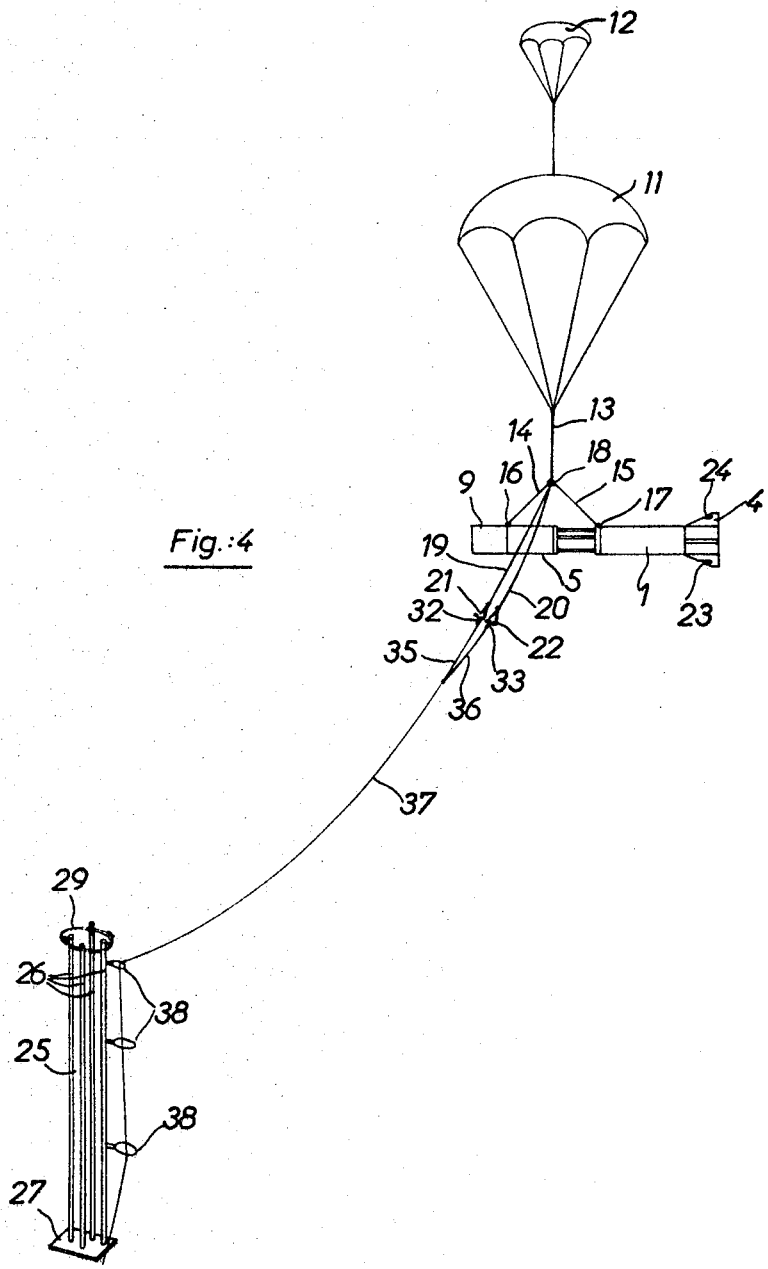
Fig.:4

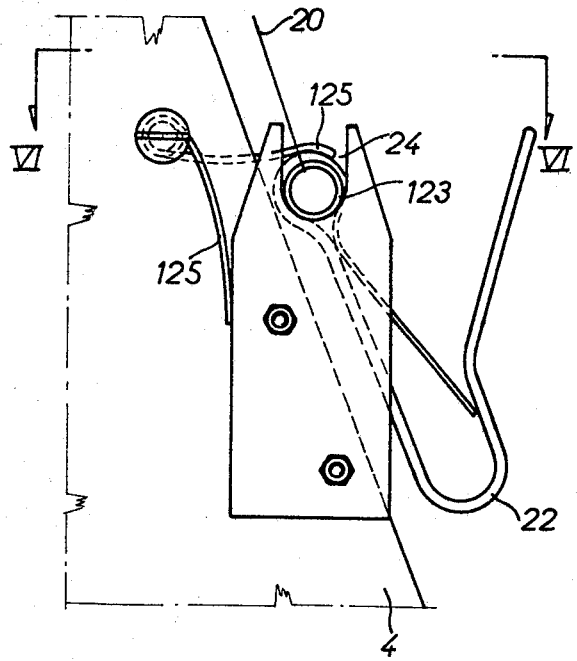
Fig.:5
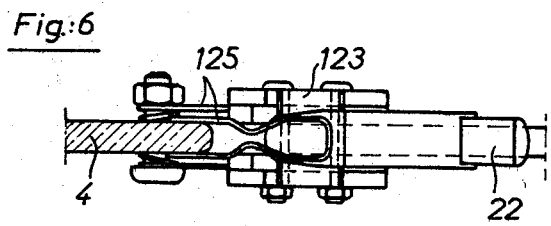
Fig.:6
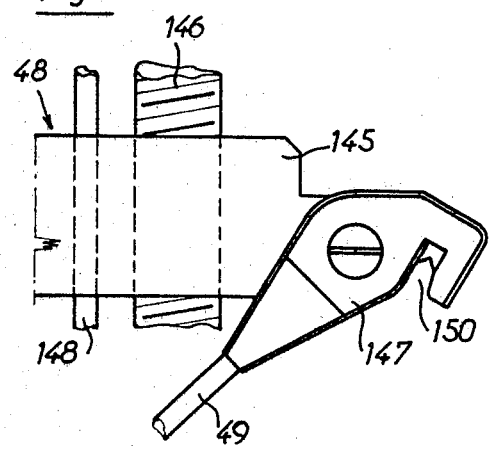
Fig.:7

3,420,100
METEOROLOGICAL OBSERVATION APPARATUS AND ITS INFRASTRUCTURE INSTALLATION
Ernest Marie René Dubois, Fontenay-aux-Roses, France, assignor to Bertin et Compagnie, Paris, France, a company of France
Filed Jan. 12, 1967, Ser. No. 608,898
Claims priority, application France, Jan. 14, 1966, 45,964
U.S. Cl. 73—170                                   10 Claims
Int. Cl. G01w 1/08

ABSTRACT OF THE DISCLOSURE

A device for making meteorological measurements and comprising, in addition to a propulsion system for a sonde which contains measuring instruments and which is connected to a parachute, a recovery cable which unwinds when the device climbs and which is rewound to return the sonde to its starting place.

Background of the invention

This invention relates to routine meteorological observation facilities, especially in the low layers of the atmosphere—up to about 1,000 metres.

A captive balloon is only a "second-best" device, for its heavy drag limits its maximum altitude at wind speeds above a few metres per second, nor can it provide measurements of wind speed and direction with sufficient accuracy and with a fairly short response time.

The use of a small remotely controlled helicopter with a stabilising system has also been considered as a means of taking measurements but is a complex and very costly solution of the problem.

Summary of the invention

The invention relates to an apparatus for making such measurements and mainly comprising the combination of a propulsive device, a sonde containing measuring and possibly recording instruments, a controlled-release parachute connected to the sonde or to the complete apparatus, and a recovery cable which unwinds when the apparatus climbs and which is rewound to return the sonde or the complete apparatus to its starting place.

This invention also relates to various other improvements relating to an apparatus of this kind and to an infrastructure installation enabling it to be used.

Brief description of the drawing

FIGURE 2 is a diagrammatic view in isometric perspective of the launching ramp and cable-unwinding system;

FIGURE 3 is a plan view showing the device on its launching ramp;

FIGURE 4 is a diagrammatic view showing the recovery of the apparatus, and

FIGURES 5, 6 and 7 are views to an enlarged scale of constructional details, FIGURE 6 being a section on the line VI—VI of FIGURE 5.

Description of the preferred embodiment

Figure 1:
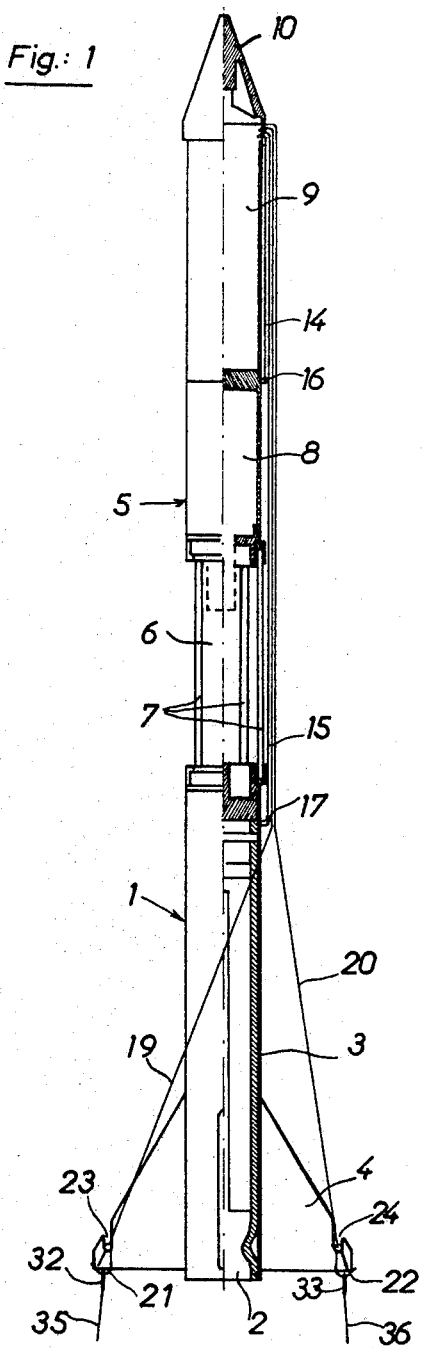
FIGURE 1 is a view in elevation and axial half-section of the apparatus according to this invention.

The apparatus shown in FIGURE 1 is in general shape cylindrical and comprises a power-operated or better, hot-water operated propulsive device 1 which stands vertical with its nozzle 2 opening downwards, the device 1 being received in a cylinder 3 having a cruciform tail unit 4.

In the case of a water operated device, propulsion is provided by the energy stored by heating in a mass of water and restored by the expansion of a jet in the nozzle. There is partial evaporation of the water and the vapor-water mixture is ejected at a relatively low speed and therefore with a high propulsive efficiency. The simplest form of heating is electric heating on the ground either by means of an insulated water-immersed resistor or by using the water itself as a resistance. A stop valve is provided between the water tank and the nozzle.

Disposed on top of the propulsive device 1 is a sonde 5 comprising: an aerated enclosure 6 bounded, e.g., by three bracing rods 7 and receiving the facilities for sensing the required atmospheric data; and a chamber 8 containing facilities for recording and/or remotely transmitting the measurements.

The following items of information can be gathered photographically, by remote radio measurement or otherwise:

Pressure, e.g., by a vacuum capsule mechanically connected to two mirrors moving a light spot;

Temperature, by a thermistance or a thermocouple which delivers a voltage acting on a mirror galvanometer;

Humidity, by absorption of an infra-red radiation, and

Wind direction and speed, by using the change which the wind causes in the shape of a smoke trail or of opaque condensates which can come from the propelling jet or from a generator in the sonde.

When the apparatus is climbing, a number of photographic views are taken of the complete trail on two plates disposed one each in two cameras which view at 90° to one another and which are disposed some hundreds of metres away from the departure place.

On top of the sonde 5 extends a magazine or storage space 9 closed by a conical head 10 in the form of two possibly releasable half-shells and serving to receive a parachute system; the same is shown in FIGURE 4 and comprises a main parachute 11 and a pilot parachute 12. The harness 13 of the main parachute is connected by lines 14, 15 to fixing points 16, 17 disposed on either side of the center of gravity of the device. Two lines 19, 20 extend from junction 18, where harness 13 is connected to the lines 14, 15, to snap hooks 21, 22 disposed in recesses 23, 24 at two diametrically opposite places of the tail unit 4. The snap hook 22 has, as can be seen in FIGURES 3, 5 and 6, a hollow spindle 123 which is retained in recess 24 by a spring 125 and which receives line 20. Similar considerations apply to the other snap hook 21.

The apparatus just described can be launched from a guiding ramp 25 (FIGURES 2 and 3) comprising four rods 26 which are secured to the ground by way of a base 27 and which are connected at the top by cross-members 28 to a crown 29. The base 27 can be secured to the ground by stakes 52 engaged in holes 51 and/or by guys 53 secured, e.g., to the crown 29. At least one pair of the rods 26 is disposed between two adjacent fins of the cruciform tail unit 4 to inhibit any rolling motion at launching. Two plates 30, 31 are disposed at the crown 29, and two rings 32, 33 previously placed in recesses 34 in the crown 29 rest on the two plates 30, 31. The rings 32, 33 are connected by lines 35, 36 to the end of a recovery cable 37 threaded through guide loops 38 secured laterally along an upright 126 secured to the launch ramp 25.

A system for handling the recovery cable 37 is disposed near the ramp 35. This system, which can be seen in FIGURE 2, comprises a driving motor 39 whose output shaft 40 drives via respective belts 41, 42 a torque converter 43—e.g. an electromagnetic torque converter controlled via wiring 143—and a shaft 44 connected by some form of transmission (not shown) to a winder 45 for a reel 46. The converter 43 is disposed at the end of a shaft of a winch 47 having a device for introducing and guiding line associated with an entry arm 49 which cooperates with a reel 50, the same being rigidly secured to the winch shaft, the cable 37 being wound on the reel 50. The reel 50 is substantially coaxial of the rings 38 in order that the cable 37 may unwind as from a fishing-line reel (the ramp 25 is shown offset from the winding system merely in order to clarify the drawing).

FIGURE 7 shows a detail of the device 48. A support 145 is adapted to move along a worm 146 and bears a hook 147 bounding a recess 150, while a rod 148 rigidly secured to a fixed element 149 prevents the support 145 from rotating around a screw 146.

The complete installation operates as follows:

The apparatus is first placed in its launch ramp 25, whereafter the rings 32, 33 are placed on the plates 30, 31 and engaged in the recesses 34. The rings 32, 33 therefore extend into the inside of crown 29. After firing, the apparatus climbs, being guided by the ramp 25, and the snap-hooks 21, 22 engage the rings 32, 33 as they pass by. The cable 37 then starts to be vehicled along with the apparatus and unwinds freely from the reel 50 throughout the climb of the apparatus.

When the same has reached the required altitude, some appropriate parachute ejection system, such as a detonator connected to some form of remotely controlled or automatic firing, releases the two half-shells forming the cone 10 and ejects a weight which pulls the pilot parachute 12 with it. The same is opened and thus opens the main parachute 11.

The abrupt increase in tension transmitted by the lines 19, 20 connected to the harness 13 expels the snap-hooks 21, 22 from their respective recesses 23, 24 so that they may escape fro mtheir spring 125, whereafter the apparatus is suspended by the lines 14, 15.

The driving motor 39 is started and the arm 49 places the cable 37 in the recess 50 of the hook 147 (FIGURE 7). The cable is therefore wound on to the winch 47. Preferably, the recovery cable winding system just described is so disposed relatively to the ramp 25 that the tension of the cable 37 tends to shift the same from left to right in FIGURE 2. The hook 147 controls this movement to give a continuous layer of cable on the winch, then returns the cable in the opposite direction to produce another layer of cable, until the apparatus lands near the recovery base. The motor 39 is then stopped, the snap-hooks 21, 22 are unhooked, and the lines 35, 36 are released from them and are then secured to the reel 46 on the winder 45. The motor 39 is restarted and the cable is then wound on to the reel 46. Upon completion of the operation, the reel 46 is installed instead of the reel 50 and the cycle of operations can restart when the apparatus, after appropriate refueling, is placed on the ramp 25.

I claim:

1. An apparatus for making meteorological measurements in the low layers of the atmosphere, comprising in combination a propulsive device, a sonde to be propelled by said device and containing measuring instruments, a controlled-release parachute having a harness connected at least to said sonde, a recovery cable attached at least to said sonde, a cable storing system on which said cable is wound and from which said cable is unwindable as said sonde moves away, and means for rewinding said cable on said system, whereby at least said sonde is tugged back.

2. An apparatus as set forth in claim 1, wherein the propulsive device comprises a hot-water rocket.

3. An apparatus as set forth in claim 1, further comprising snap-hooks whereby the parachute harness is connected to the recovery cable.

4. An apparatus as set forth in claim 3, wherein the snap-hooks are positioned and disposed initially, the recovery cable being disconnected, in recesses formed on said apparatus.

5. An apparatus as set forth in claim 4, wherein the propulsive device comprises a tail unit, and the snap-hooks accommodating recesses are positioned at diametrically opposite places of said tail unit.

6. An apparatus as set forth in claim 5, further comprising a launching ramp for the propulsive device—sonde—parachute assembly, the cable storing system and cable rewinding means being positioned in the vicinity of said ramp.

7. An apparatus as set forth in claim 6 further comprising ring-like connecting elements at an end of the cable disposed at such places of the launching ramp so as to be on the path of the snap-hooks at starting, whereby the same, as they pass by, engage with said ring-like elements.

8. An apparatus as set forth in claim 6, further comprising guide loops disposed along the launch ramp and into which the recovery cable is threaded.

9. An apparatus as set forth in claim 1, wherein the cable storing system comprises a reel.

10. An apparatus as set forth in claim 1, wherein the cable rewinding means comprise a winch.

References Cited

UNITED STATES PATENTS

| | | | |
|---|---|---|---|
| 2,347,160 | 4/1944 | Wallace | 73—170 X |
| 3,053,479 | 9/1962 | Siegel et al. | 273—97 X |
| 3,229,517 | 1/1966 | Smith | 73—170 |

RICHARD C. QUEISSER, *Primary Examiner.*

JERRY W. MYRACLE, *Assistant Examiner.*

U.S. Cl. X.R.

102—34.1, 34.2; 244—23